Patented Feb. 3, 1942

2,271,665

UNITED STATES PATENT OFFICE 2,271,665

PROCESS FOR REMOVING ALKYL SULPHIDES FROM SWEETENED HYDROCARBON FLUIDS

Walter A. Schulze and Lloyd C. Morris, Bartlesville, Okla., assignors to Phillips Petroleum Company, a corporation of Delaware No Drawing. Application February 12, 1940, Serial No. 318,648

5 Claims. (Cl. 196—28)

This invention relates to a process for removing dialkyl monosulphides from hydrocarbon fluids and to a specific reagent therefor. More specifically, this invention relates to the treatment of low-boiling hydrocarbon distillates, relatively pure hydrocarbon compounds obtained from said distillates by fractionation, natural gasolines and the components thereof including normally gaseous hydrocarbons for the selective removal of dialkyl monosulphides, hereinafter termed alkyl sulphides, associated with said hydrocarbon fluids.

Hydrocarbon fluids in general, such as those obtained from petroleum oils and other sources contain varying amounts of sulphur compounds as impurities. Among these sulphur compounds may be listed hydrogen sulphide, mercaptans, alkyl sulphides, dialkyl disulphides, thiophenes and thiophanes which are distributed in the various products obtained from crude hydrocarbon fluids according to their boiling points or to their relative volatility in hydrocarbon mixtures. Also, the kinds and amounts of said sulphur compounds occurring in any hydrocarbon fluid vary with the method of manufacturing and processing said hydrocarbon fluid. For example, cracking operations have a tendency to convert hydrogen sulphide and open-chain sulphur compounds into cyclic compounds, and the various "sweetening" processes are designed to convert mercaptans into dialkyl disulphides and other polysulphides. Thus, the kinds and amounts of sulphur compounds occurring in a hydrocarbon fluid will depend on the boiling-range of the fluid and on the previous treatment of the fluid or of the crude product from which it was obtained.

There are conventional methods for removing hydrogen sulphide from hydrocarbon fluids, also methods for converting mercaptans to dialkyl disulphides. Further, there are means known to the art for the substantially complete removal of mercaptans as such, and for the conversion of all types of organic sulphur compounds to hydrogen sulphide which is then easily removable. Of all these known processes, however, only the last named will effect a conversion and removal of alkyl sulphides. In fact, not until the present invention has there been disclosed any reagent or process which is specific for alkyl sulphides or which makes possible the selective removal of such from hydrocarbon fluids.

The necessity for removing alkyl sulphides arises when any hydrocarbon fluid contaminated with same is to be substantially completely desulphurized. One object of this invention, then, is to provide a more complete desulphurization of hydrocarbon fluids after conventional means have been used to remove hydrogen sulphide and mercaptans.

The origin of alkyl sulphides, of general formula R—S—R' where R and R' represent any alkyl group, is obscure, although such compounds may be formed by the reaction of olefins with hydrogen sulphide, thus:

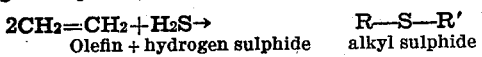

or by a splitting reaction as follows:

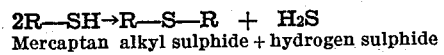

These compounds have boiling points intermediate the corresponding mercaptans and the corresponding dialkyl disulphides of the formula R—S—S—R'. Further, alkyl sulphides are remarkably resistant to further oxidation; for example, such strong oxidizing agents as alkaline permanganate solutions are required to form the corresponding sulphoxides and sulphones. For this reason alkyl sulphides are not affected by the reagents of the various "sweetening" processes for the oxidation of mercaptans directly to disulphides. The alkyl sulphides also have the tendency to form azeotropic mixtures with lower boiling hydrocarbons and thus to occur in relatively large concentrations in hydrocarbon fractions from which removal by fractionation is not possible. For example, although pure methyl sulphide boils at about 100° F., this compound often occurs in butane fractions boiling at about 32° F., or in mixtures of butane with higher and/or lower boiling hydrocarbons.

We have discovered that alkyl sulphides can be substantially completely removed by a brief contact-type treatment with an efficient reagent, said reagent and process being the basis of our invention. We have discovered that when alkyl sulphides are brought in contact with substantially anhydrous cupric chloride in the substantially complete absence of water including water of crystallization, that the alkyl sulphides react to form a type of addition compound which is insoluble in hydrocarbon fluids. The exact reaction thus occurring is not known, but it is suggested, without thereby limiting our invention, that this reaction takes place:

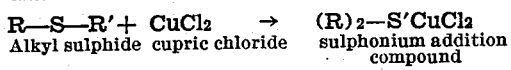

This projected formation of an addition compound is based on the fact that anhydrous conditions are necessary for the reaction, and that chloride ions are not substantially displaced by the reaction. Further, the spent cupric chloride reagent may be quickly and completely regenerated by heating gently at atmospheric or sub-atmospheric pressures.

Dialkyl disulphides do not react with our anhydrous cupric chloride reagent, but hydrogen sulphide and mercaptans will react therewith forming metal sulphide and dialkyl disulphides respectively. Thus hydrogen sulphide and mercaptans should be absent from a hydrocarbon fluid being treated by our process to avoid spending the reagent. It will be evident that our selective process is designed to treat a "sweet" oil, and is not intended to parallel or replace any of the conventional processes for removal of hydrogen sulphide or for the conversion of mercaptans.

Our invention contemplates bringing a sweet hydrocarbon fluid, either in liquid or vapor form into intimate contact with solid anhydrous cupric chloride. By this intimate contact, the alkyl sulphides present in the hydrocarbon fluid are reacted upon and retained by the cupric chloride reagent. Our cupric chloride reagent may be the solid compound alone in suitable particle size, or the reagent prepared by impregnating a solid adsorbent carrier material with cupric chloride solutions in water, and subsequent drying of the impregnated material to substantially anhydrous form which entails the removal of water of solution and water of crystallization. Or, the anhydrous cupric chloride may be intimately mixed with an anhydrous carrier material to obtain greater dispersion and active surface for the reagent. We have found that superior physical properties affecting the contact of reagent with hydrocarbon fluid may be obtained by the use of our carrier-impregnated anhydrous reagent.

We have further discovered that our process is not limited to the use of anhydrous cupric chloride as such, but that we can prepare an active reagent by impregnating an adsorbent carrier material with a water solution of salts which furnish the requisite cupric copper and chloride ions. For example, in the preparation of our cupric chloride reagent we may use a solution containing cupric sulphate or acetate and a chloride of the alkali or alkaline earth metals or of ammonium, zinc, magnesium or aluminum. Such impregnated reagents when dried to a substantially anhydrous condition are active in the removal of alkyl sulphides from hydrocarbon oils.

The following examples are included to further illustrate the operation of our process without implying thereby any limitation on our invention.

*Example I*

A butane fraction manufactured at a natural gasoline plant was found to contain hydrogen sulphide, mercaptans and alkyl sulphides. This stock was caustic washed, sweetened and refractionated to remove the disulphides resulting from the sweentening process. Analysis then showed a sulphur content of 0.008 weight per cent of alkyl sulphides which were removed by percolating the dry hydrocarbon liquid through an anhydrous reagent prepared by impregnating fuller's earth with cupric chloride solution and subsequent complete drying. After this treatment, the butane contained 0.0002 weight per cent of sulphur, indicating substantially complete removal of alkyl sulphides.

To prove that the removal of alkyl sulphides was not due to the fuller's earth, some of the same butane was passed through a bed of anhydrous fuller's earth without cupric chloride. The effluent from this treatment showed an initial decrease in sulphur content, but after several volumes of butane had been passed through the bed there was no further removal of sulphur.

*Example II*

A mixture of butanes and pentanes segregated at a refinery was freed of hydrogen sulphide by conventional means and sweetened with a reagent comprising fuller's earth impregnated with a solution of cupric sulphate and sodium chloride. The sulphur content of the hydrocarbon liquid was 0.005 weight per cent.

This stock was then carefully dried and passed again over a reagent comprising fuller's earth impregnated with a solution of cupric chloride, but there was no reduction of the sulphur content, indicating no removal of alkyl sulphides. However, when the dried stock was percolated over a substantially anhydrous bed of cupric chloride the sulphur content was reduced to 0.0002 weight per cent, indicating substantially complete removal of alkyl sulphides.

Similarly, substantially complete removal of dialkyl sulphides was obtained by passing the same stock over a reagent prepared by drying to anhydrous condition fuller's earth impregnated with a solution of cupric sulphate and sodium chloride.

*Example III*

A sweet, hydrogen sulphide-free liquid hydrocarbon mixture containing mainly hexanes and heptanes was analyzed and found to contain 0.006 weight per cent of sulphur as alkyl sulphides and disulphides. To this stock was added a mixture of methyl sulphide, methylethyl sulphide, ethyl sulphide and butyl sulphide to result in a sulphur content of 0.043 weight per cent. This stock was then passed in the absence of water over a reagent prepared by impregnating fuller's earth with a solution of cupric sulphate and sodium chloride and drying to substantially anhydrous state. The hydrocarbon mixture after this treatment had a sulfur content of 0.0028 weight per cent, indicating complete removal of all the added alkyl sulphides as well as the alkyl sulphides present in the original material. When the reagent became spent, it was easily regenerated by heating gently.

The temperatures of treatment using our process are ordinary atmospheric temperatures between 30 and 110° F. Higher temperatures may be used, but such tend to favor the reversal of the removal reaction.

The pressures at which our process operates may be low super-atmospheric pressures usually between 15 and 500 pounds per square inch. The operating pressure may depend on the nature of the fluid being treated, for example, in treating normally gaseous fluids such as propane and butane in liquid phase, sufficient pressure is provided to avoid vaporization.

We usually prefer to treat in liquid phase since the volume of reagent required for nominal flow rates, say 0.5 to 10 volumes per hour per volume of reagent, is not excessive. However, treating in gaseous or vapor phase is entirely satisfactory with normally gaseous hydrocarbons, providing due allowance for contact time is made in the size of the reagent bed.

It is thought that the foregoing description and examples have adequately defined our invention, the scope of which is limited only by the following claims.

We claim:

1. The process for removing alkyl sulphides from sweet hydrocarbon fluids which comprises contacting said hydrocarbon fluids in a substantially dehydrated condition with a reagent containing a substantial proportion of substantially anhydrous cupric chloride.

2. The process for removing alkyl sulphides from sweet low-boiling hydrocarbon fluids containing same which comprises passing said fluids over a reagent comprising an adsorbent material impregnated with cupric chloride, said reagent being maintained in a substantially anhydrous condition.

3. In the process of desulphurizing low-boiling hydrocarbon fluids, the step of passing said fluids subsequent to the removal of hydrogen sulphide and mercaptans over a reagent containing a substantial proportion of anhydrous cupric chloride, said reagent being maintained in a substantially anhydrous condition, whereby alkyl sulphides are removed from the hydrocarbon fluid and more complete desulphurization is obtained.

4. The process for removing alkyl sulphides from sweet low-boiling hydrocarbon fluids containing same which comprises passing said fluids over a copper chloride reagent maintained in a substantially anhydrous condition, said reagent being prepared by impregnating fuller's earth with an aqueous solution of copper sulphate and sodium chloride and then drying until the reagent is in a substantially anhydrous condition.

5. The process for the removal of alkyl sulphides from hydrogen sulphide and mercaptan-free hydrocarbon fluids which comprises contacting said fluids subsequent to dehydration with a substantially anhydrous reagent comprising a carrier material and cupric chloride.

WALTER A. SCHULZE.
LLOYD C. MORRIS.